UNITED STATES PATENT OFFICE.

SALMON W. WILDER, OF LAWRENCE, MASSACHUSETTS.

IMPROVEMENT IN CLEANSING PAPER, WHEN REDUCED TO PULP, FROM COLORING-MATTERS.

Specification forming part of Letters Patent No. 99,735, dated February 8, 1870.

*To all whom it may concern:*

Be it known that I, SALMON W. WILDER, of Lawrence, of the county of Essex and State of Massachusetts, have made a new and useful invention having reference to the Cleansing of Paper, when Reduced to a Pulp, from Coloring-Matters; and I do hereby declare the same to be fully described in the following specification.

The reduction of common written or printed paper to a pulp as ordinarily effected consists in, first, subjecting it, in a rotary steam boiler or vessel, to the action of steam and alkalies, or other chemical matters, such as will combine with the grease or carrying vehicle of the ink or coloring materials, and leave the latter in a state to be removed by water or a bleaching solution; next, the paper so treated is subjected to the action of a common rag-engine, by which it is reduced to pulp.

The usual process of cleansing the pulp of the coloring-matters is by means of the rag-engine and water and chemicals introduced therein, such being expensive and requiring much time, and is usually very imperfect in its results. In the rag-engine the paper is washed and reduced to pulp before the chemicals are employed, for the purpose of preparing it for the paper-making machine.

In carrying out my invention I take the pulp, after having been made in the rag-engine, or otherwise, and run it into a vat containing a rotary hollow foraminous cylinder, having an educt through either or each of its journals or ends, such vessel being a revolving sieve or strainer, such as will allow the water to flow through it, but not permit the pulp or paper stuff to pass with the water.

Into this vat with the pulp I allow a very large quantity of water to flow, the amount of water to the pulp being greatly in excess, or sufficient to effect the thorough removal of the loose coloring-matters thereof. The flowage of water through the vat and cylinder is to be continuous. The pulp will be taken up on the periphery of the rotary foraminous cylinder, which should be nearly submerged in the water of the vat. With this cylinder I employ a coucher, or apparatus such as is used in a cylinder paper-making machine, for removing the pulp from a woven-wire cylinder thereof.

The water is to be supplied to the vat in such quantities, from time to time, as may be necessary to insure a thorough cleansing of the pulp, the supply of pulp in the meantime to the vat being equal to that removed from the cylinder by the coucher. The material may be removed from the coucher in any proper manner. In this way I am able to thoroughly cleanse the pulp of the coloring-matters and fit it for being bleached or otherwise treated preparatory to being again converted into paper.

What I claim as my invention is—

The employment of water, a foraminous cylinder, and a couching apparatus, substantially in manner as described, in the treatment of paper pulp containing coloring-matters, preparatory to such pulp being bleached or otherwise treated for being converted into paper.

SALMON W. WILDER.

Witnesses:
R. H. EDDY,
J. R. SNOW.